Nov. 29, 1966  A. BOTTANI  3,288,549
COMBINED FILM AND SLIDE PROJECTOR
Filed Feb. 12, 1964
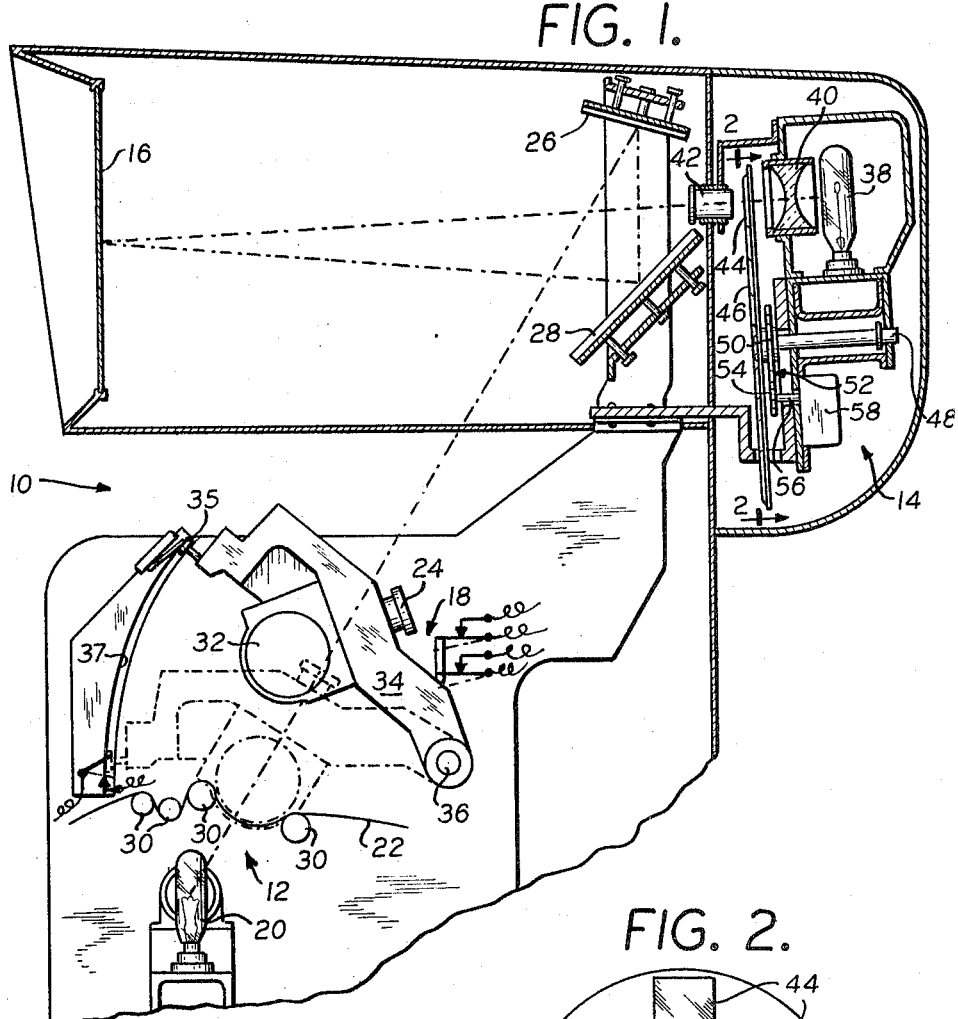
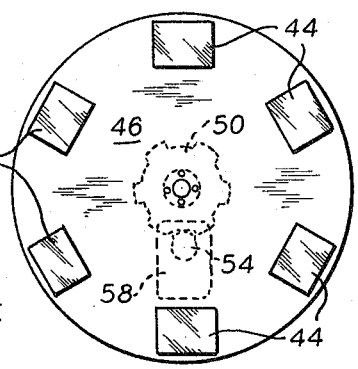
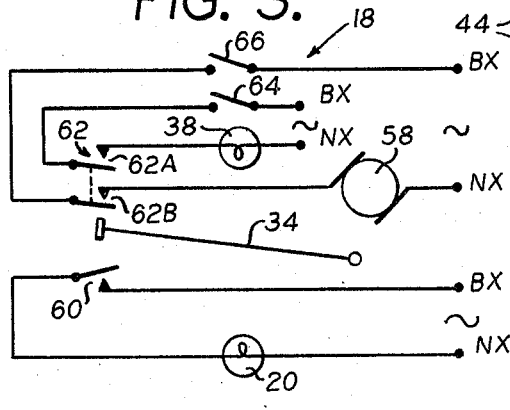
INVENTOR
ANGELO BOTTANI
BY Hubbell, Cohen &
Stiefel
ATTORNEYS

United States Patent Office 3,288,549
Patented Nov. 29, 1966

3,288,549
COMBINED FILM AND SLIDE PROJECTOR
Angelo, Bottani, Milan, Italy, assignor to Societa Internazionale Fonovisione S.p.A., Milan, Italy, a corporation of Italy
Filed Feb. 12, 1964, Ser. No. 344,380
Claims priority, application Italy, Feb. 14, 1963, 3,042/63
3 Claims. (Cl. 352—131)

This invention relates to a combined film and slide projector and particularly to a combined film and slide projector especially suited for actuation by a coin, token or push button operation.

It has been known in the prior art to construct a film projector which contains a plurality of individual sound films, which, at the selection of the user, are individually projected onto a suitable screen borne by the apparatus itself. When no film is projected, the screen is generally dark and the apparatus is in an "off" condition. Since the off condition of such apparatus can occur quite frequently and often for substantial periods of time, the oft darkened screen is a disadvantage to such apparatus. One of the major disadvantages flowing from this condition is that the machine fails to attract attention for further use of the films. This may result in diminished revenue from the machine.

Accordingly, the main object of the present invention is to provide a slide projector in combination with a film projector and means for interlocking the two so that when the film projector is not operating the slide projector will project an image upon the screen of the device, and thereby attract attention.

Another object of the present invention is the provision of a film propector having a screen, which film projector is combined with a slide projector adapted to project slide images on the same screen, and means interlocking the two projectors so that they will not project simultaneously.

Still another object of the present invention is the provision of a slide projector with a film projector, both of which projectors are adapted to project images on the same screen, and a simple electromechnical interlocking means for alternatively energizing the film projector and the slide projector.

The above and other objects, characteristics and features of the present invention will be more fully understood from the following description taken in connection with the accompanying illustrative drawing.

In the drawing:

FIG. 1 is a vertical sectional view of a projection apparatus embodying the present invention;

FIG. 2 is a sectional view taken along the line 2—2 of FIG. 1; and

FIG. 3 is a schematic circuit diagram of the interlocking means embodied in the present invention.

Referring now to the drawing in detail, the projection device is generally designated by the reference numeral 10. The device includes a film projector 12, a slide projector 14, both of which are adapted to project images on a screen 16, and interlocking means 18 for alternatively energizing the film projector 12 and the slide projector 14.

The film projector 12 may be combined with a device for selecting one of a large number of different films, which different films may all be sound films so that the projector 10 is adapated to selectively project any of the plurality of films and the viewer can hear the accompanying soundtrack. However, the present invention is not limited to such a device and may be employed with a film projector having only one film. The film projector 12 includes a lamp 20 which is adapted to emit light through a film 22, a lens 24 and then off mirrors 26 and 28 which are arranged to direct the light image onto the screen 16.

While, as already indicated, the film supply means may be of any desired construction, as shown herein the film 22 passes around suitable sprockets 30 which are adapted to advance the film around a transparent pressure roller 32 carried by a movable arm 34 which also carries the lens 24. As will be seen hereinafter, the movable arm 34 forms a part of the interlocking means 18 and is mounted for movement between two positions, one shown in FIG. 1 in solid lines and the other shown in FIG. 1 in dotted lines. As shown herein the arm 34 is pivotally movable about a pivot point 36 although other forms of movement might be employed. The manner of moving the arm 34 about the pivot 36 may be manual or motor acuated, depending on the choice of the designer. Further, the free end of the arm 34 may be provided with a slide or roller 35 interfitted in a supporting and guiding track 37.

The slide projector 14 comprises a lamp 38, a condensing lens 40 and an objective lens 42 which are adapted to focus the image of a slide on to the screen 16. The slide is disposed for projection between the condensing lens 40 and the objective lens 42. As herein illustrated, the slides are designated by the reference numeral 44, and a number of them (here shown as 6) are mounted on a slide holder 46, depicted herein as a circular disc or plate. The slide holder 46 is rotatably mounted on a shaft 48 which carries the driven member 50 of a Geneva movement 52. The driving member 54 of the geneva drive 52 is fixed to the output shaft 56 of a motor means 58. As is well known to those familiar with Geneva drives, when the motor 58 is energized a slide 44 will dwell in illuminating position between the condensing and objective lenses 40 and 42 for a predetermined time interval while the driving member 54 rotates; and after the predetermined time interval, the geneva driving member 54 will engage a slot of the driven member 50 and rotate the driven member a predetermined number of degrees here shown to be 60°, whereby to move one of the slides 44 out of projecting position and to move the next slide into projecting position. In this way a number of different slides may be projected by the slide projecting apparatus 14. However, if desired, the movability of the slide holder 46 may be omitted in which event a single slide 44 may be projected on the screen 16 in accordance with the present invention.

As previously noted the interlocking means 18 is adapted to alternatively energize either the film projector 12 or the slide projector 14. Specifically, as has already been pointed out, the pivotally mounted arm 34 is movable between two extreme positions, namely a dotted line position as shown in FIG. 1 in which the film projector 12 is energized and the slide projector 14 is deenergized, and a solid line position as shown in FIG. 1, in which the slide projector 14 is energized and the film projector 12 is deenergized. As the arm 34 is adapted to occupy either one or the other of these two positions, it will be seen that the film projector 12 and the slide projector 14 cannot be energized at the same time. To effect this form of operation two limit switches are employed. These limit switches are designated by the reference numerals 60 and 62, the limit switch 60 being normally open but being closed when the arm 34 is in the dotted line position shown in FIG. 1, and the limit switch 62 being normally open but being closed when the arm 34 is in its solid line position as shown in FIG. 1. The operation of the switches 60 and 62 is effected by engagement of the arm 34 directly with the movable contact of the two switches. (Of course, indirect engagement and operation may be employed.) As will be understood from the following description the switch 62 is provided with two independent contacts 62A and 62B to control two elements in the slide projector 14 namely lamp 38 and motor 58. It will be understood that if only one of the elements needed to be controlled then the switch 62 could have a single contact. For example, if the slide holder 46 were stationary, then motor 58 and its controlling contact 62B could be dispensed with.

As may best be seen in FIG. 3, the film projector lamp 20 is controlled by the normally open switch contact 60. Accordingly, the film projector lamp 20 is energized only when the arm 34 is in its lower or dotted line position at which time the switch 60 is closed. At that same time, the contact 62A and 62B of the switch 62 will be open. The lamp 38 of the slide projector 14 is energized by a circuit including the normally open contact 62A of the switch 62. Thus the lamp 38 is energized only when the arm 34 is in its raised position to close the switch 62. Likewise, the motor 58 for the geneva drive 52 of the slide projector 14 is energized over the contact 62B of the switch 62. Accordingly, the driving mechanism for the slide holder 46 will operate only when the arm 34 is in its raised or solid line position in which position the switch 62 is closed and the switch 60 is open. As shown herein manual switches 64 and 66 are included in the energizing circuits for the slide projector lamp 38 and the slide projector motor 58 respectively to provide manual control of the energization of these two elements, if desired.

The operation of the projector 10 is as follows. With the arm 34 of the interlocking means 18 in its raised or solid line position as shown in FIG. 1, and with the manually operable contacts 64 and 66 closed, the switch 62 will be closed and the switch 60 will be open. Accordingly, the slide projector lamp 38 will be energized over a circuit which may be traced from the terminal BX of a suitable power source, over the manually operable switch contact 64, over contact 62A of closed switch 62, through the lamp 38 to the other terminal NX of the power source. Thus, the slide projector lamp 38 will be energized to illuminate a slide 44. Assuming a plurality of slides 44 are mounted on a movable slide holder 46 as previously described, then the motor 58 will also be energized at this time. This energization may be traced from the terminal BX of the power source, over the closed manual contact 66, over the closed contact 62B of the closed switch 62, through the motor 58 to the terminal NX. Thus motor 58 will, through the Geneva drive 52, intermittently advance slide holder 46 to periodically change slides. However, when the pivotally movable arm 34 is moved downwardly from the solid line position shown in FIG. 1 to the dotted line position shown in FIG. 1 the contacts 62A and 62B of the switch 62 will open to denergize the slide projector lamp 38 and slide projector motor 58 whereby to stop the slide projector's operation. At the same time the arm 34 will engage the switch 60 and close that normally open switch whereby to energize the projector lamp 20 over a circuit which may be traced from the terminal BX over the switch 60 through the lamp 20 to the terminal NX. Naturally, similar circuits may be employed to energize the driving motor for the film 22 or other associated apparatus in the film projector. This may be accomplished over the single contact 60 or by contacts in parallel with the contact 60 or by means separate and distinct from the interlocking means 18. In any event the film cannot be projected except when the lamp 20 is on. Accordingly, the film can only be projected when the arm 34 of the interlocking means 18 is in its lower or dotted line position in which event the slide projector will not be projecting.

As previously noted, the movement of the arm 34 between its two positions may be manually effected or may be effected by motor mean if deired. In either event, if the device 10 is a coin actuated device the movement of the arm 34 may be unlocked by the insertion of one or more coins into the device 10 so that the arm 34 can only be moved from its solid line position to its dotted line position as shown in FIG. 1 after the insertion of such a coin or coins. Other details of the apparatus will suggest themselves to those skilled in the art, but are not necessary to an understanding of the present invention.

Regardless of the precise form of the apparatus it will be obvious that by utilizing the teachings of this invention the screen 16 will be maintained illuminated with an image at all times. When a viewer chooses to view a film he will be able to select the film and actuate the apparatus by inserting a coin and causing the movable arm 34 to move to its downward position. At the conclusion of the showing of the film the arm 34 will be moved upwardly to its raised position, either by manual or motor operation, in which position it will deactuate the film projector but acuate the slide projector so that images will continue to appear on the screen. The continued projection of images on the screen will tend to attract attention to the apparatus and thereby cause other viewers to choose films to view. This increased utilization of the machine will result in increased revenue therefrom.

While I have herein shown and described the preferred form of the present invention and have suggested modifications therein, other changes and modifications may be made therein within the scope of the appended claims without departing from the spirit and scope of this invention.

What I claim is:

1. Projection apparatus comprising a translucent screen having a front surface confronting the viewer and a rear surface; a motion picture film projector for projecting motion picture film images onto said rear surface of said screen including film guide means for guiding film along a predetermined path, illumination means on one side of said predetermined path, an arm movably between first and second positions, a pressure roller mounted on said movable arm for engaging said film and holding said film in said predetermined path when said arm is in said first position; a slide projector comprising light projector means for projecting light at said rear surface of said screen, a movable slide holder, means for moving said slide holder for moving a slide into and out of register with said light projecting means; means for energizing said film projector including said movable arm in said first position, and means for energizing said slide projector including said movable arm in said second position.

2. The projection apparatus of claim 1 wherein said arm is pivotally movable between said first and second positions, and said means for energizing said film projector includes contact means operatively engageable with said arm in said first position, and said means for energizing said slide projector includes contact means operatively engageable with said arm in said second position.

3. The projection apparatus of claim 2, wherein said arm is disposed on the opposite side of said predetermined path, and lens means mounted on said arm for directing light from said illumination means toward said screen, said lens means being in light directing relation only when said arm is in said first position.

References Cited by the Examiner
UNITED STATES PATENTS

| | | | |
|---|---|---|---|
| 3,159,841 | 12/1964 | Castedello | 352—136 |
| 3,169,442 | 2/1965 | Reddle et al. | 88—24 |
| 3,202,044 | 8/1965 | Harris | 88—24 |

NORTON ANSHER, *Primary Examiner.*

HAROLD H. FLANDERS, *Assistant Examiner.*